US012595932B2

(12) United States Patent
Satyanarayana et al.

(10) Patent No.: US 12,595,932 B2
(45) Date of Patent: Apr. 7, 2026

(54) SYSTEMS AND METHODS FOR POWERING WATER HEATING DEVICES USING WIRELESS POWER TRANSMISSIONS

(71) Applicant: Rheem Manufacturing Company, Atlanta, GA (US)

(72) Inventors: Harsha Satyanarayana, Norwalk, CT (US); Christopher Mark Hayden, Shelton, CT (US)

(73) Assignee: Rheem Manufacturing Company, Atlanta, GA (US)

( * ) Notice: Subject to any disclaimer, the term of this patent is extended or adjusted under 35 U.S.C. 154(b) by 121 days.

(21) Appl. No.: 18/387,846

(22) Filed: Nov. 7, 2023

(65) Prior Publication Data

US 2024/0159427 A1 May 16, 2024

Related U.S. Application Data

(60) Provisional application No. 63/383,476, filed on Nov. 11, 2022.

(51) Int. Cl.
*H02J 50/30* (2016.01)
*F24H 1/00* (2022.01)
(Continued)

(52) U.S. Cl.
CPC ............ *F24H 1/0018* (2013.01); *H02J 50/12* (2016.02); *H02J 50/20* (2016.02); *H02J 50/30* (2016.02); *H05B 6/04* (2013.01); *H02J 2105/42* (2026.01)

(58) Field of Classification Search
CPC ......... F24H 1/0018; H02J 50/12; H02J 50/20; H02J 50/30; H02J 2310/14; H02J 50/402; H02J 50/80; H02J 50/90; H05B 6/04
See application file for complete search history.

(56) References Cited

U.S. PATENT DOCUMENTS 8,784,077 B1    7/2014 Ray
9,680,330 B2 *  6/2017 Rudser ................ A61M 60/508
(Continued)

FOREIGN PATENT DOCUMENTS

| CN | 104600861 A | 5/2015 |
| DE | 19510780 A | 9/1996 |
| JP | 2012065477 A | 3/2012 |

OTHER PUBLICATIONS

Cota: Real Wireless Power, 'Long range wireless power delivered without cables, batteries, line-of-sight, or charging pads'; https://www.ossia.com/cota, 7 pages.
(Continued)

*Primary Examiner* — Daniel Cavallari
*Assistant Examiner* — Brian K Baxter
(74) *Attorney, Agent, or Firm* — Eversheds Sutherland (US) LLP

(57) ABSTRACT

Systems, devices and methods for wirelessly charging a water heater device are presented. A system for wirelessly charging a water heating device, the system comprising: the water heating device, wherein the water heating device comprises a water heating element; a wireless power transmitter configured to: receive a first electrical current from a first power source; and generate a magnetic field, an ultrasonic wave, a microwave, a wireless power transmission, or a laser pulse based on the first electrical current; and a wireless power receiver configured to: generate a second electrical current based on the magnetic field, the ultrasonic wave, the microwave, the wireless power transmission, or the laser pulse; and provide the second electrical current to the water heating element or to a second power source of the water heating device.

20 Claims, 10 Drawing Sheets

(51) Int. Cl.
  *H02J 50/12* (2016.01)
  *H02J 50/20* (2016.01)
  *H05B 6/04* (2006.01)
  *H02J 105/42* (2026.01)

(56) References Cited

U.S. PATENT DOCUMENTS

| | | | | |
|---|---|---|---|---|
| 10,135,257 | B1* | 11/2018 | Adolf | H02J 50/12 |
| 10,163,564 | B2* | 12/2018 | Bae | H01F 38/14 |
| 11,264,841 | B2 | 3/2022 | Zeine | |
| 11,271,433 | B2 | 3/2022 | Zeine et al. | |
| 11,394,247 | B1* | 7/2022 | Tsibulevskiy | H02J 7/06 |
| 11,881,723 | B2* | 1/2024 | Melone | A47J 47/01 |
| 2010/0181964 | A1* | 7/2010 | Huggins | H02J 50/40 |
| | | | | 320/108 |
| 2010/0219183 | A1* | 9/2010 | Azancot | H02J 50/10 |
| | | | | 219/676 |
| 2010/0308664 | A1* | 12/2010 | Face | H03K 17/965 |
| | | | | 307/104 |
| 2011/0204720 | A1* | 8/2011 | Ruiz | B60L 53/305 |
| | | | | 307/66 |
| 2012/0025624 | A1* | 2/2012 | Lee | H02J 7/00034 |
| | | | | 307/104 |
| 2013/0207599 | A1* | 8/2013 | Ziv | H02J 50/80 |
| | | | | 320/108 |
| 2013/0221915 | A1* | 8/2013 | Son | H02J 50/80 |
| | | | | 320/108 |
| 2014/0008996 | A1* | 1/2014 | Iwasa | E04B 5/43 |
| | | | | 307/104 |
| 2014/0253026 | A1* | 9/2014 | Du | H02J 50/10 |
| | | | | 320/108 |
| 2015/0102773 | A1* | 4/2015 | Song | H02J 7/0042 |
| | | | | 320/108 |
| 2015/0194838 | A1* | 7/2015 | Won | H04B 5/24 |
| | | | | 320/108 |
| 2016/0254677 | A1* | 9/2016 | McKernan | H02J 50/80 |
| | | | | 307/9.1 |
| 2017/0025876 | A1* | 1/2017 | Chan | H02J 7/0068 |
| 2017/0256993 | A1* | 9/2017 | Nakamura | H02J 50/80 |
| 2017/0288472 | A1* | 10/2017 | Stoufer | H04B 5/79 |
| 2018/0212470 | A1* | 7/2018 | Leem | H02J 9/005 |
| 2018/0254639 | A1* | 9/2018 | Bell | H04B 7/0617 |
| 2018/0301268 | A1* | 10/2018 | Kramer | H01F 27/327 |
| 2019/0199139 | A1* | 6/2019 | Perry | H02J 50/30 |
| 2019/0250689 | A1* | 8/2019 | Ivanov | G06F 1/3203 |
| 2021/0044157 | A1* | 2/2021 | Kawamae | H02J 7/007188 |
| 2022/0046767 | A1* | 2/2022 | Seguí Díaz-Pache | |
| | | | | F24H 9/0021 |
| 2023/0299613 | A1* | 9/2023 | Abiri | H02J 50/20 |
| | | | | 320/107 |
| 2024/0332969 | A1* | 10/2024 | Clift | G06Q 30/0283 |

OTHER PUBLICATIONS

The Truth about Xiaomi "Air Charging"—YouTube, https://www.youtube.com/watch?v=PvWMeo1tcgQ.

The Wireless Power Company, Wi-Charge, https://www.wi-charge.com, 5 pages.

The quest for Nikola Tesla's wireless power technology—YouTube, https://www.youtube.com/watch?v=z97iOZQd-B4.

Invisible Wireless Charger Under Desk Fast UTS-1, Kew Labs, https://www.kewlabstech.com/product/uts-1-invisible-wireless-charger, 13 pages.

How does distance affect magnetic force?, Socratic, https://socratic.org/questions/how-does-distance-affect-magnetic-force, 1 page.

Cota by Ossia—Real Wireless Power Demonstration Video—YouTube, https://www.youtube.com/watch?v=HEfPgx51cas.

* cited by examiner

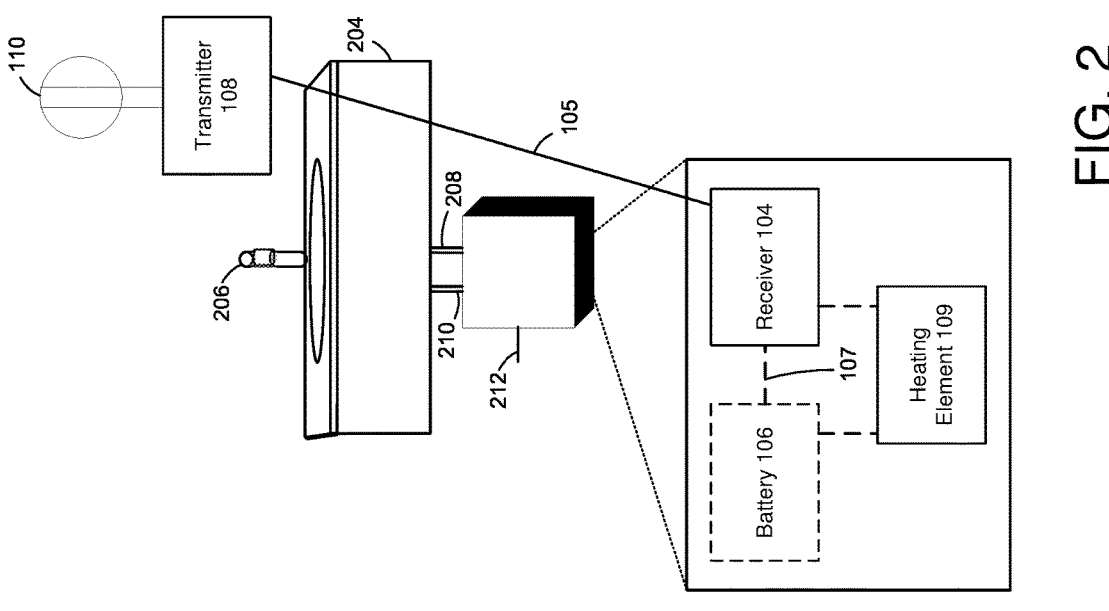
FIG. 2

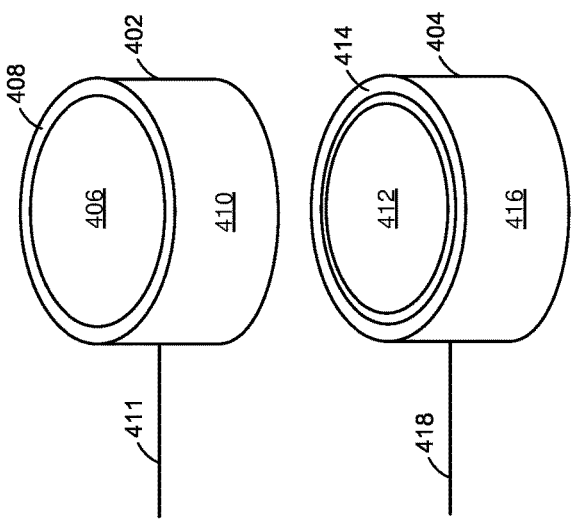
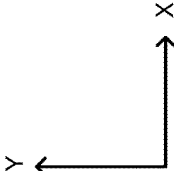
FIG. 4

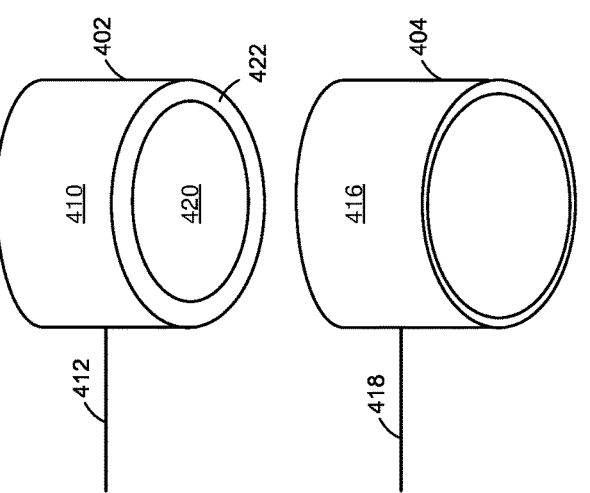
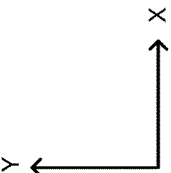
FIG. 5

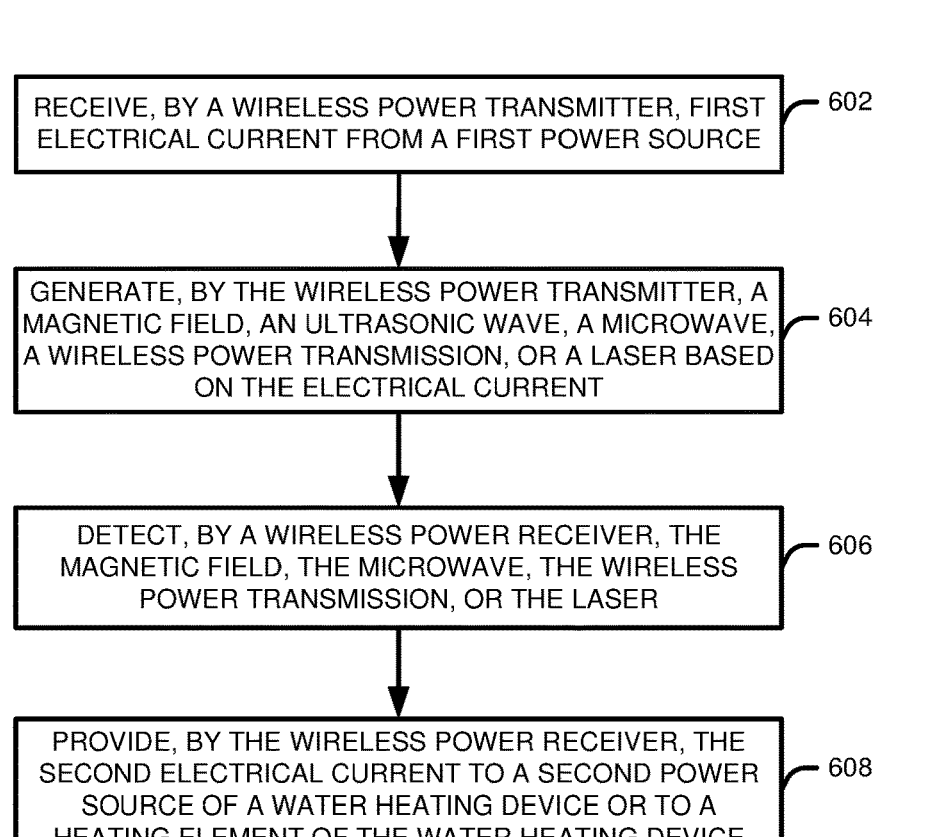

600

RECEIVE, BY A WIRELESS POWER TRANSMITTER, FIRST ELECTRICAL CURRENT FROM A FIRST POWER SOURCE — 602

GENERATE, BY THE WIRELESS POWER TRANSMITTER, A MAGNETIC FIELD, AN ULTRASONIC WAVE, A MICROWAVE, A WIRELESS POWER TRANSMISSION, OR A LASER BASED ON THE ELECTRICAL CURRENT — 604

DETECT, BY A WIRELESS POWER RECEIVER, THE MAGNETIC FIELD, THE MICROWAVE, THE WIRELESS POWER TRANSMISSION, OR THE LASER — 606

PROVIDE, BY THE WIRELESS POWER RECEIVER, THE SECOND ELECTRICAL CURRENT TO A SECOND POWER SOURCE OF A WATER HEATING DEVICE OR TO A HEATING ELEMENT OF THE WATER HEATING DEVICE — 608

FIG. 6

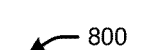
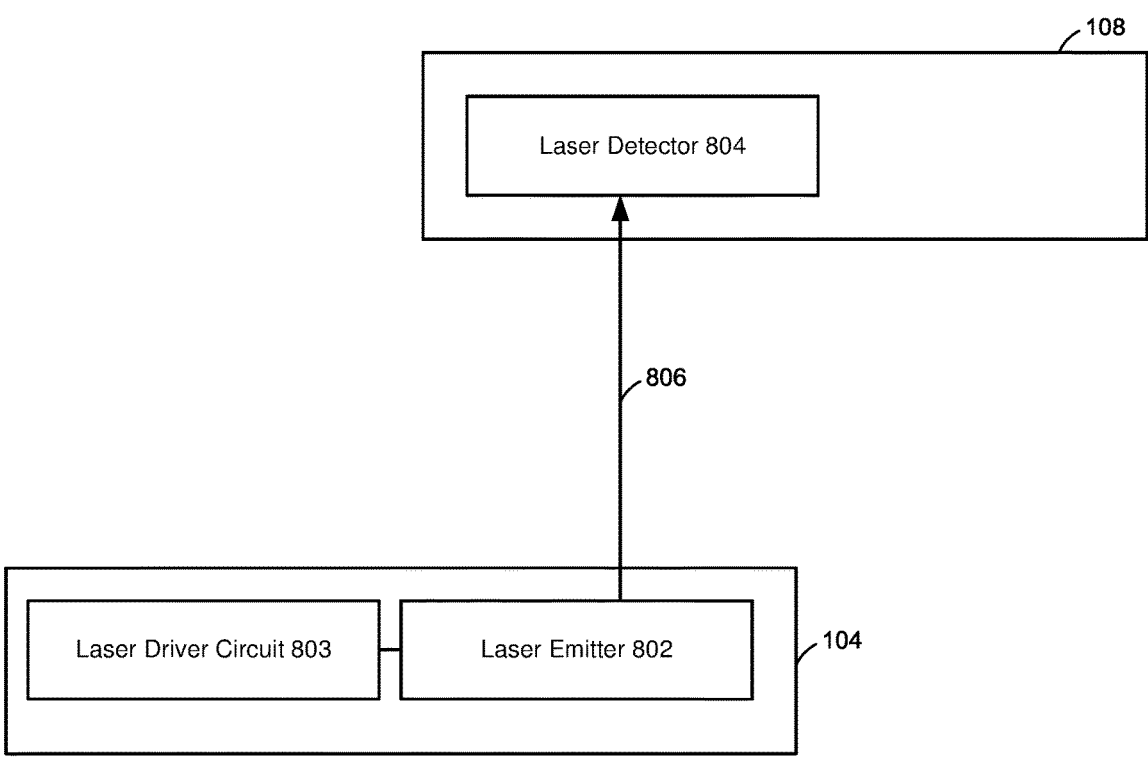
FIG. 8

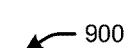
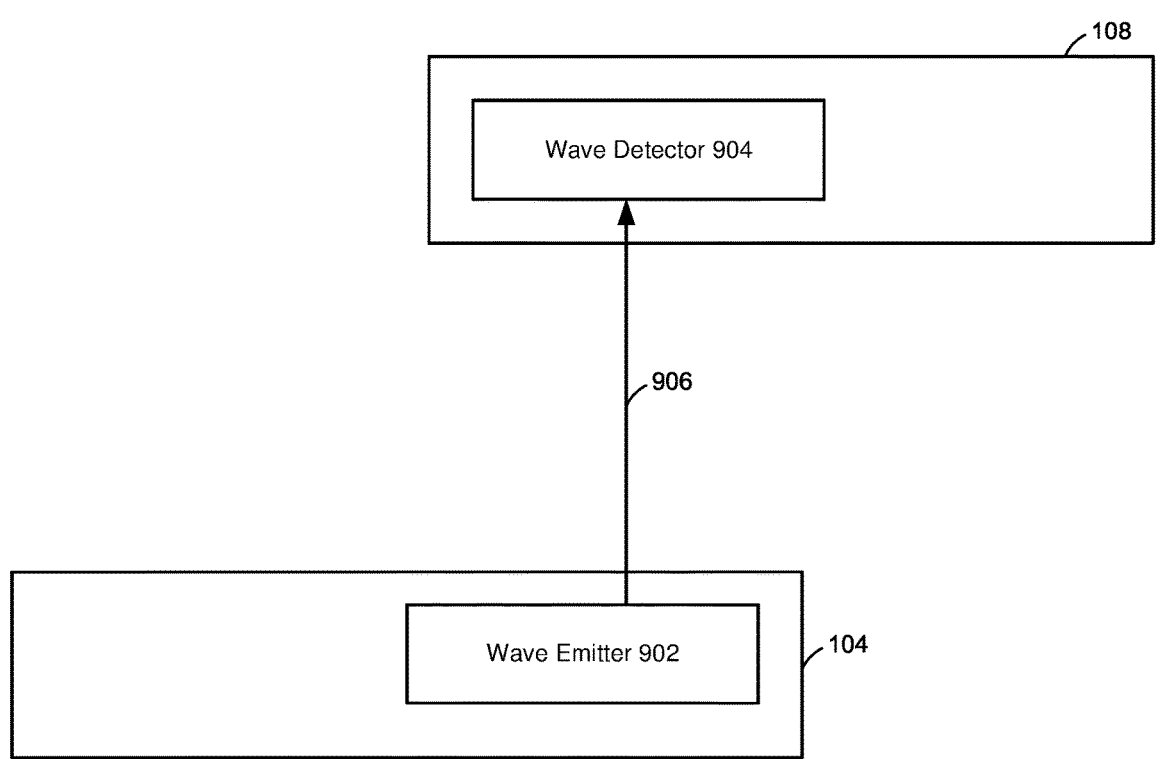
FIG. 9

SYSTEMS AND METHODS FOR POWERING WATER HEATING DEVICES USING WIRELESS POWER TRANSMISSIONS

CROSS-REFERENCE TO RELATED APPLICATION(S)

The present application claims priority to and the benefit of U.S. Provisional Patent Application No. 63/383,476, filed Nov. 11, 2022, which is hereby incorporated by reference herein in its entirety.

FIELD

The present disclosure is generally related to water heating devices and more particularly related to using wireless charging to charge and power water heating devices.

BACKGROUND

Water heating devices may be located in areas where plugging them into power receptacles may be impractical or inconvenient, requiring extension cords and/or installation of new power receptacles. In this manner, optimal placement of a water heating device may be impeded by impractical or inconvenient locations of existing power receptacles and objects or other obstructions located in between the water heating device and a power receptacle.

BRIEF DESCRIPTION OF THE DRAWINGS

FIG. 2 illustrates a system for wirelessly charging a water heater device in accordance with one embodiment of the present disclosure.

FIG. 4 illustrates a system for wirelessly charging a water heater device in accordance with one embodiment of the present disclosure.

FIG. 5 illustrates the system of FIG. 4 for wirelessly charging a water heater device in accordance with one embodiment of the present disclosure.

FIG. 6 is a flow diagram illustrating an example process for wirelessly charging a water heater device in accordance with one embodiment of the present disclosure.

FIG. 8 illustrates an example of wireless charging using lasers in accordance with one embodiment of the present disclosure.

FIG. 9 illustrates an example of wireless charging using ultrasonic waves and microwaves in accordance with one embodiment of the present disclosure.

DETAILED DESCRIPTION

Figure 1:
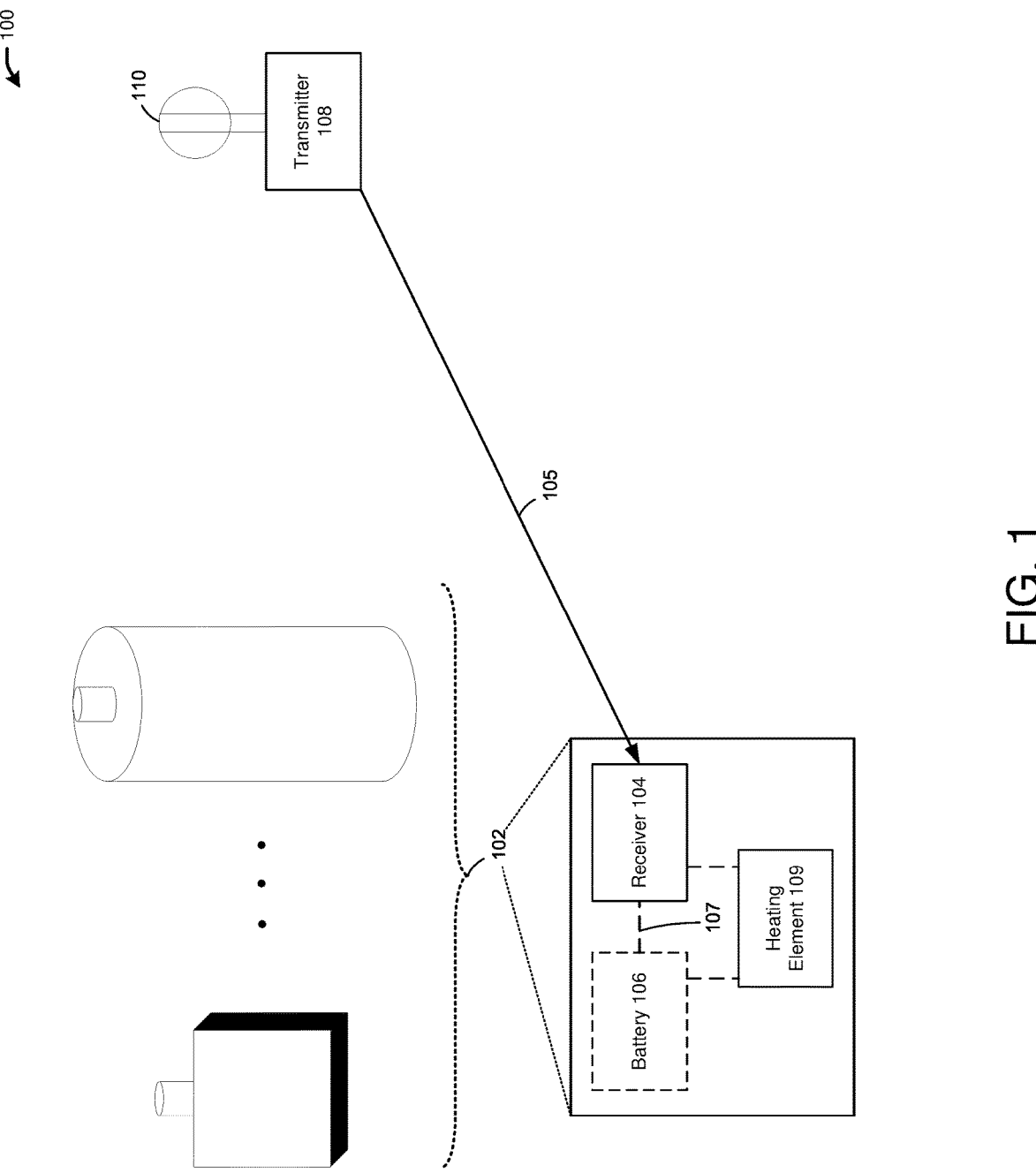
FIG. 1 is a schematic diagram illustrating a system for wirelessly charging a water heater device in accordance with one embodiment of the present disclosure.

Water heating devices may be positioned at a point-of-use (e.g., underneath a sink, near a faucet, in a room near an appliance using hot water, etc.) or may be positioned remotely from appliances that use hot water, such as in a basement, garage, attic, or utility room. One of the constraints to using water heaters at a point-of-use is the availability of a power source (e.g., a power outlet) at the point-of-use. Even though extension cables can be used, their use is not an ideal solution, and rewiring to install a power source (e.g., a power outlet) can be not only expensive, but can sometimes be very challenging due to architectural constraints or the like.

In certain instances, powering water heating devices using wireless power transmission technology can overcome these challenges. However, wireless power transmission for a point-of-use water heating devices, such as water heating devices underneath or otherwise near a sink, may be challenging due to the placement of power receptacles on a wall and, in some instances, a surface (e.g., countertop) that may be disposed in between the power receptacles and the location (e.g., underneath the sink) where the water heating device may be located.

Certain wireless charging standards have been developed that define inductive technology for closely coupled solutions with short distances (e.g., up to 40 millimeters-1.6 inches) and resonant wireless charging for a loosely coupled solution (e.g., when the transmitter and receiver coils are not the same size or the distance between the coils is greater than the diameter of the coils), allowing power transmission over multiple feet. Depending on the placement of a battery for powering an appliance (or thermo-storage of hot water for an appliance) relative to the wireless charging transmitter, inductive or resonant wireless charging may be used.

In one or more embodiments, using a wireless power transmitter plugged into a power receptacle (e.g., a power outlet) and a power receiver attached at the water heater, power can be wirelessly transmitted from the power outlet to the water heater (e.g., using inductive or resonance charging). On a water heating device, there can be heating elements that can convert the wirelessly received power to heat. Alternatively, the water heating device can have a battery attached for storing the received power and delivering it later to the heating elements. The battery can also be used to power an instantaneous water heater or a storage type water heater.

In one or more embodiments, through-the-surface wireless charging utilizes an inductive transmitter and inductive receiver to transmit and receive power wirelessly. The inductive transmitter may be powered by a wire connected to an electrical outlet, and the inductive receiver may power a wire attached to a water heating device. The top of an upper body of the wireless charging device may have a raised edge and high friction surface (e.g., allowing a cup to be placed on it), freeing up space on the surface and making the wireless charging device more aesthetically pleasing. Some potential surfaces include bathroom countertops, kitchen countertops, and walls, allowing power to easily reach under bathroom sinks, under kitchen sinks, and rooms with no power receptacle access.

In one or more embodiments, wireless power may be transmitted in narrow beams, increasing the maximum distance between transmitter and receiver and improving efficiency. This can be done with lasers, microwaves, ultrasonic waves, and magnetic resonance. The tradeoff for transporting energy in narrow beams is that they may have difficulty passing through many surfaces. Narrow beam power transmission is technology is useful for powering water heaters in open areas that wires cannot reach.

In one or more embodiments, the amount of wireless power transmitted for use in heating water systems may vary. For example, kitchen and bathroom faucets may have a maximum flow rate of around 2.2 gallons per minute (sometimes limited by government regulations). For example, the wireless power transmission may use 1.25 kW of power, which for a flow rate of 2.2 gallons per minute, would heat water about 36 degrees Fahrenheit. So, a 110 Volt receptacle would use about 11 Amps, and a 220 Volt receptacle would use about 5.7 Amps. A 110 Volt receptacle is typically rated for 15 Amps or 20 Amps, and a 220 Volt receptacle is typically rated for 15 Amps, 20 Amps, or 30 Amps. A water heater flow rate may be around 3.2 gallons per minute based on demand. Using 1.25 kW to heat water at a flow rate of 3.2 gallons per minute would heat water about 35 degrees Fahrenheit. To prevent using more than 15 Amps for a 110 Volt receptacle or for a 220 Volt receptacle, the maximum amount of power that a 110 Volt receptacle should transmit should be about 1.65 kW and the maximum amount of power that a 220 Volt receptacle should transmit should be about 3.25 kW. The amount of wireless power transmitted may be based on the demand (e.g., flow rate) and desired temperature, so the amount of wireless power transmitted may be dynamic. In some embodiments, the temperature of the water in a water heater may be maintained (e.g., at 120 degrees Fahrenheit or another temperature), so the wireless transmission for water heating may supplement other water heating, reducing the amount of power needed for the wireless transmission (e.g., to 75 Watts).

In one or more embodiments, the wireless power transmission for heating water may use a low-power transmission. To heat water using less than 1.2 kW power, for example, the wireless power may be transmitted over time (e.g., according to a schedule) to heat a volume of water at a preset temperature. A recirculation loop also may be implemented to provide a loop of pre-heated water. When the power source uses a battery, the battery may use a trickle charge to provide power for heating water for limited amounts of time (e.g., five minutes of water heating for every predetermined amount of charging time to replenish the battery). The wireless power transmitter may transmit a lower amount of power (e.g., less than 1.2 kW power) when there is no current hot water demand (e.g., no hot water faucet or other supply turned on/open and water is being heated to be available upon future demand), and may increase the amount of wireless power transmitted (e.g., to 1.2 kW power or more for a 110 Volt outlet) when hot water demand is detected.

Because of the improvements herein, the physical area where a water heater is installed does not need to have a dedicated power receptacle or ready access to a power source because wireless charging from a remote power source may provide power to heat water. The water heating area may be enclosed, such as underneath a sink where a power outlet is unlikely to be installed. The wireless power transmissions may pass through various surfaces like walls, floors, and cabinets. Wireless power transmission distance may be limited. The wireless power transmission should be within a six feet from an enclosed space where the wireless transmissions are received and used to heat water, for example, which is typical in bathrooms and kitchens where ground fault circuit interrupter (GFCI) outlets are usually within a few feet of sinks/faucets. In some embodiments, a technical benefit of the wireless heating transmission may be to provide supplemental heat at a relatively low power that can be accommodated by a 110 V or 220 V power receptacle.

Turning now to the drawings, FIG. 1 is a schematic diagram illustrating a system 100 for wirelessly charging a water heater device in accordance with one or more embodiments of the present disclosure.

The system 100 may include water heater devices 102 (e.g., with or without water tanks for maintaining a water supply) which may include or may otherwise be connected to a wireless power receiver 104 and an optional battery 106 (or other power source). The water heater devices 102 may be instantaneous type water heaters (e.g., tankless) and/or water heaters that include water storage tanks. In some instances, e.g., in point-of-use settings, the tanks may be 2 gallon tanks. In other whole house settings, the tanks may be larger (e.g., 40 gallons). Any suitable sized tanks may be used herein (e.g., 0.5 gallon to 300 or more gallons). In other tankless settings, the tanks may be omitted. The wireless power receiver 104 may wirelessly receive power 105 from a remote wireless power transmitter 108 (e.g., by detecting a magnetic field and converting the magnetic field to a current, as described further with respect to FIG. 7, by receiving a laser transmission as described further with respect to FIG. 8, by receiving an ultrasonic wave or microwave as described with respect to FIG. 9, or by receiving a wireless power transmission as described with respect to FIG. 10). The wireless power receiver 104 may provide the current to the battery 106 (e.g., using a wired connection 107, which optionally may include a voltage regulator to provide a trickle charge in which the current may be provided to the battery 106 at a rate equal to a self-discharge rate of the battery 106). The water heater devices 102 may include a heating element 109 (e.g., screw-in heating elements or flange-type heating elements).

Any suitable heating elements or combinations thereof may be used herein. In some instances, the heating elements may be resistive heating elements, such as one or more electric heating elements. In this manner, the electric heating elements and/or associated controllers may be wirelessly powered in order to operate the electric heating elements and heat the water. In other instances, the heating elements may be one or more heat pump heating elements. For example, the heat pump heating elements may include a compressor, a condenser, an expansion valve, and an evaporator. In such instances, the compressor of the heat pump heating elements (and/or other components (e.g., controllers or the like) of the heat pump) may be wirelessly powered in order to operate the heat pump and heat the water. For example, the compressor may be in communication with the wireless power receiver 104 and/or the optional battery 106. In some instances, the heat pump heating elements may be a reversible heat pump. In this manner, the reversible heat pump may be used to heat or cool the water depending on the direction of the heat pump cycle. That is, although the heating elements are generally described herein as heating the water, the heating elements may also be used to cool the water in certain instances (e.g., reversible heat pumps).

The heating element 109 may receive a charge from the battery 106 or the wireless power receiver 104, which may cause the heating element to heat. As a result, the heating element 109 may cause water in the water heater devices 102 to heat based on conduction, convention, and/or radiant heat transfer between the heating element and the water of the water heater devices. Any suitable heat transfer systems and methods may be used to transfer heat between the heating element and the water of the water heater devices.

The wireless power transmitter 108 may receive current from a power source 110 (e.g., a power receptacle, battery, etc.). In some instances, the power source 110 may be provided by a utility, a proximate photovoltaic cell, or the like. In this manner, the water heater devices 102 and/or the wireless power receiver 104 may be remote from the power source 110 and the water heater devices 102, avoiding any need to be plugged into or otherwise electrically connected to the power source 110. The water heater devices 102 may use the current from the battery 106 to heat water for one or more appliances or devices using hot water. The wireless power transmitter 108 may be capable of load-shedding to provide electrical power to multiple sources. For example, the wireless power transmitter 108 may be a "whole house" transmitter capable of transmitting wireless charging about an entire structure to provide the power 105 from the power source 110 to the water heater device 102 and/or other devices in the structure.

In some instances, such as point-of-use water heaters, the wireless power transmitter 108 may be 75 W transmitter, and the wireless power receiver 104 may be a 60 W receiver. The wireless power transmitter 108 and the wireless power receiver 104 may transmit and/or receive between 25 W and 12 KW depending on the application and setting.

FIG. 2 illustrates a system 200 for wirelessly charging a water heater device (e.g., a point-of-use water heater device) in accordance with one or more embodiments of the present disclosure.

The system 200 may include the power source 110, the wireless power transmitter 108, the wireless power receiver 104, the battery 106, the wired connection 107, and the heating element 109 of FIG. 1. A water heater device 202 may include the wireless power receiver 104, the battery 106, and the wired connection 107. The wireless power receiver 104 may generate current to power the water heater device 202 as described above with respect to FIG. 1. The water heater device 202 may be positioned below a surface 204 (e.g., a countertop, cabinetry, a wall, etc.), which may be in between the wireless power receiver 104 and the wireless power transmitter 108. The water heater device 202 may be used to provide hot water to a faucet 206 (which, in some instances, may dispense water from 1.5 to 2.2 gallons per minute) using one or more water lines (e.g., water line 210, water line 208), and may receive a supply of water from a supply line 212. In some instances, the water heater device 202 may be disposed along a hot water line 210 to near instantaneously heat water along the hot water line that is provided to the faucet 206. That is, the water heater device 202 may initially heat the water from the hot water line 210 near the faucet 206 in order to provide near instant hot water to the faucet 206 to avoid any delay or lag of hot water to the faucet 206. In this manner, because the water heater device 202 may be underneath a sink and unable to be plugged into the power source 110 without running cable around or through the surface 204, wireless charging may be used to provide the power 105 from the power source 110 to the water heater device 202. In this manner, the water heater device 202 may be wirelessly charged through the surface 204 (e.g., countertop) via the wireless power transmitter 108 disposed on the other side of the surface 204.

Figure 3:
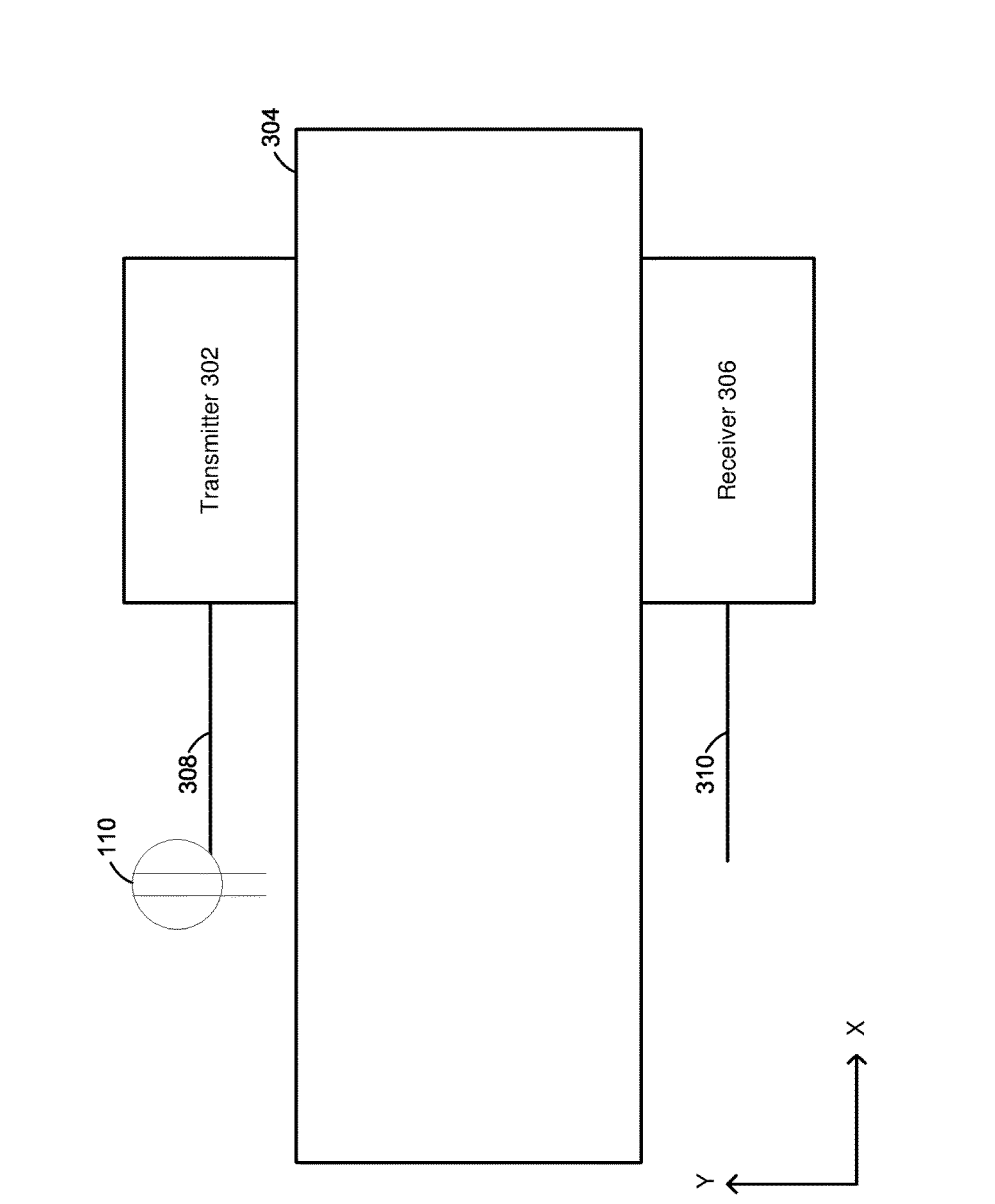
FIG. 3 is a schematic diagram illustrating a system for wirelessly charging a water heater device in accordance with one embodiment of the present disclosure.

FIG. 3 is a schematic diagram illustrating a system 300 for wirelessly charging a water heater device of one embodiment of the present disclosure.

Referring to FIG. 3, the system 300 provides an example of how a wireless power transmitter 302 may wirelessly provide power through a surface 304 (e.g., a countertop or the like) to a wireless power receiver 306. The wireless power transmitter 302 may receive current from the power source 110 (e.g., via a wire 308), which may be positioned on the same side of the surface 304 as the wireless power transmitter 302 (e.g., the opposite side of the surface 304 as the wireless power receiver 306). Because of the wireless power transmission through the surface 304, the wireless power receiver 306 may provide current to a water heater device (e.g., the water heater devices 102 of FIG. 1, the water heater device 202 of FIG. 2) via a wire 310.

FIG. 4 illustrates a system 400 for wirelessly charging a water heater device of one embodiment of the present disclosure.

Referring to FIG. 4, the system 400 may include a wireless power transmitter 402 and a wireless power receiver 404. The wireless power transmitter 402 may include a high-friction surface 406 with a raised edge 408 (e.g., for preventing objects, such as cups or mugs, from falling/sliding off). The wireless power transmitter 402 may include an upper body 410 and may connect to a wire 411 (e.g., which may connect to the power source 110 of FIG. 1). The wire 411 may provide electrical power to the wireless power transmitter 402, which may wirelessly provide power to the wireless power receiver 404 (e.g., as explained further with respect to FIG. 7).

Still referring to FIG. 4, the wireless power receiver 404 may include an inductive receiver surface 412 for receiving wireless power from the wireless power transmitter 402. The wireless power receiver 404 may include an adhesive surface 414 (e.g., double sided tape, etc.) with which to affix the wireless power receiver 404 to a surface (e.g., as shown with the wireless power receiver 306 in FIG. 3). The wireless power receiver 404 may convert the power received wirelessly into electricity to be provided to a water heater device (e.g., the water heater devices 102 of FIG. 1, the water heater device 202 of FIG. 2) via a wire 418.

FIG. 5 illustrates the system 400 of FIG. 4 for wirelessly charging a water heater device of one embodiment of the present disclosure.

As shown in FIG. 5, the wireless power transmitter 402 also may include an inductive transmitter surface 420 for wirelessly transmitting electrical power to the wireless power receiver 404 (e.g., to the inductive receiver surface 412 of FIG. 4). The wireless power transmitter 402 also may include an adhesive surface (e.g., double sided tape, glue, epoxy, etc.) for affixing the wireless power transmitter 402 to a surface (e.g., the surface 304 as shown in FIG. 3).

FIG. 6 is a flow diagram illustrating an example process 600 for wirelessly charging a water heater device of one embodiment of the present disclosure.

At block 602, a system (e.g., including the water heaters 102, the wireless power receiver 104, the battery 106, and the wireless power transmitter 108 of FIG. 1, the water heater 202, the wireless power receiver 104, the battery 106, and the wireless power transmitter 108 of FIG. 2, the wireless power transmitter 302 and the wireless power receiver 306 of FIG. 3), may receive first electrical current (e.g., alternating current) from a first power source (e.g., the power source 110 of FIG. 1). In particular, the first power source may provide a voltage that the system may convert to alternating current.

At block 604, the system may use a wireless power transmitter (e.g., the wireless power transmitter 108 of FIG. 1) to generate a magnetic field, an ultrasonic wave, a microwave, a wireless power transmission (e.g., radiofrequency transmission), or a laser based on the electrical current. This magnetic field generation is explained further with respect to FIG. 7. The ultrasonic wave or microwave generation is explained further with respect to FIG. 9. The radiofrequency generation is explained further with respect to FIG. 10. The laser generation is explained further with respect to FIG. 8.

At block 606, the system, using a wireless power receiver (e.g., the wireless power receiver 104 of FIG. 1) may detect the magnetic field generated by the wireless power transmitter. When a coil of the wireless power receiver is close enough to the coil of the wireless power transmitter, the magnetic field may generate (e.g., induce) a second electrical current in the coil of the wireless power receiver. Alternatively, the wireless power receiver may receive or detect a laser pulse, a radiofrequency transmission, or an emission of an ultrasonic or microwave, which may be transmitted based on a current supplied to the wireless power transmitter.

At block 608, the system, using the wireless power receiver, may provide the second electrical current to a second power source (e.g., the battery 106 of FIG. 1) or to a heating element (e.g., the heating element 109 of FIG. 1) of a water heater device (e.g., the water heaters 102 of FIG. 1, the water heater 202 of FIG. 2). For example, the wireless power receiver may be wired to the second power source or heating element of the water heater device. The wireless power receiver may convert the second electrical current to direct current to charge the second power source or heating element. In this manner, power may be transmitted wirelessly to a water heater device so that the water heater device does not need a wireless connection to a power receptacle. The wireless power receiver may provide a trickle charge to the second power source in which the current provided to the second power source at a rate equal to a self-discharge rate of the second power source.

Figure 7:
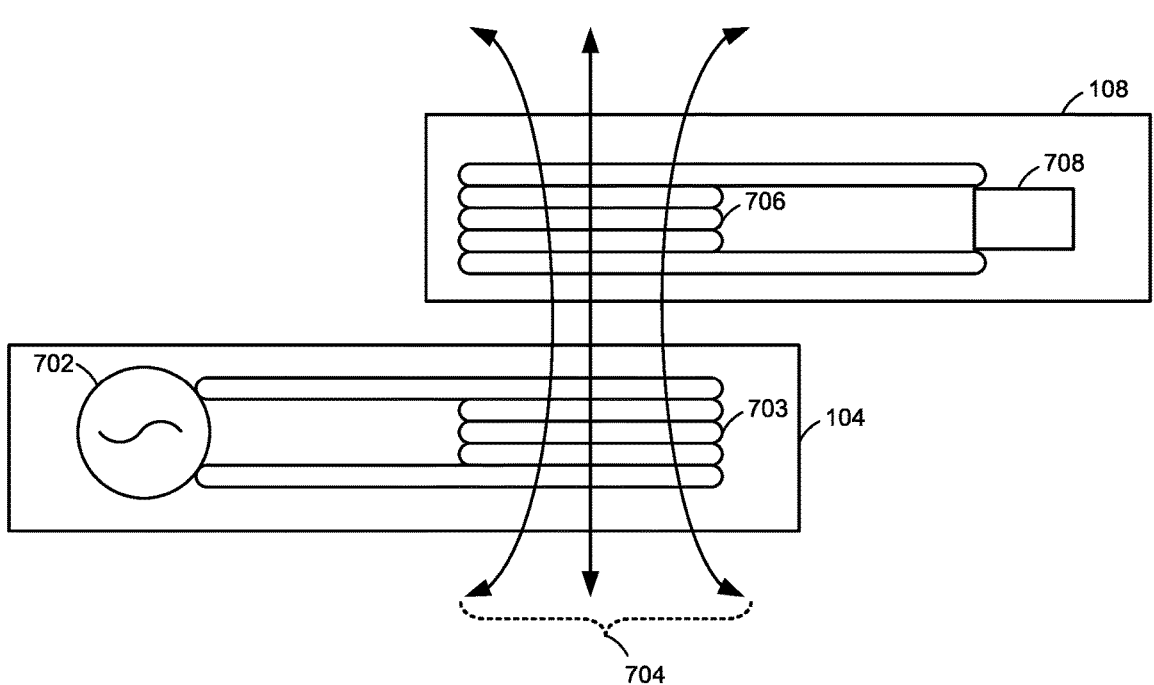
FIG. 7 illustrates an example of wireless charging in accordance with one embodiment of the present disclosure.

FIG. 7 illustrates an example of wireless charging 700 of one embodiment of the present disclosure.

Referring to FIG. 7, more detailed views of the wireless power transmitter 104 and the wireless power receiver 104 of FIG. 1 are shown. The wireless power transmitter 104 may include a power source 702 (e.g., powered by the power source 110 of FIG. 1) whose voltage the wireless power transmitter 104 may convert to current. The current may be sent to a coil 703, and the flow of the current through the coil 703 may result in an induced magnetic field 704. A coil 706 of the wireless power receiver 104 may detect the magnetic field 704, which may generate (e.g., induce) a current in the coil 706. The current in the coil 706 may flow through a rectifier circuit 708, and the wireless power receiver 104 may convert the current to direct current (e.g., to charge the battery 106 of FIG. 1).

FIG. 8 illustrates an example of wireless charging 800 using lasers of one embodiment of the present disclosure.

Referring to FIG. 8, more detailed views of the wireless power transmitter 104 and the wireless power receiver 104 of FIG. 1 are shown. The wireless power transmitter 104 may include a laser emitter 802 and a laser driver circuit 803. The wireless power receiver 104 may include a laser detector 804. The laser emitter 802 may emit laser pulses 806 generated by the laser driver circuit 803, which may be a source of current (e.g., from the power source 110 of FIG. 1) to drive diodes of the laser emitter 802, resulting in laser pulses 806. The laser detector 804 may detect the laser pulses 806 (e.g., using photodiodes), and the wireless power receiver 104 may convert the laser pulses 806 to current to charge the battery 106 or the heating element 109 of FIG. 1.

FIG. 9 illustrates an example of wireless charging 900 using ultrasonic waves and microwaves of one embodiment of the present disclosure.

Referring to FIG. 9, more detailed views of the wireless power transmitter 104 and the wireless power receiver 104 of FIG. 1 are shown. The wireless power transmitter 104 may include a wave emitter 902 for emitting ultrasonic waves or microwaves 906. The wireless power receiver 104 may include a wave detector 904 for detecting the ultrasonic waves or microwaves 906. To emit ultrasonic waves, the wave emitter 902 may including a transmission head and reflector to reflect an ultrasonic wave based on current (e.g., from the power source 110 of FIG. 1) flowing to the wave emitter 902. To emit microwaves, the wave emitter 902 may include one or more microwave array emitters for emitting microwaves based on the current supply. To detect ultrasonic waves, the wave detector 904 may include an ultrasonic receiving head. To detect microwaves, the wave detector 904 may include diodes for the detection and an electromagnetic absorption material for converting the microwaves into current. The wireless power receiver 104 may provide the current to charge the battery 106 or the heating element 109 of FIG. 1.

Figure 10:
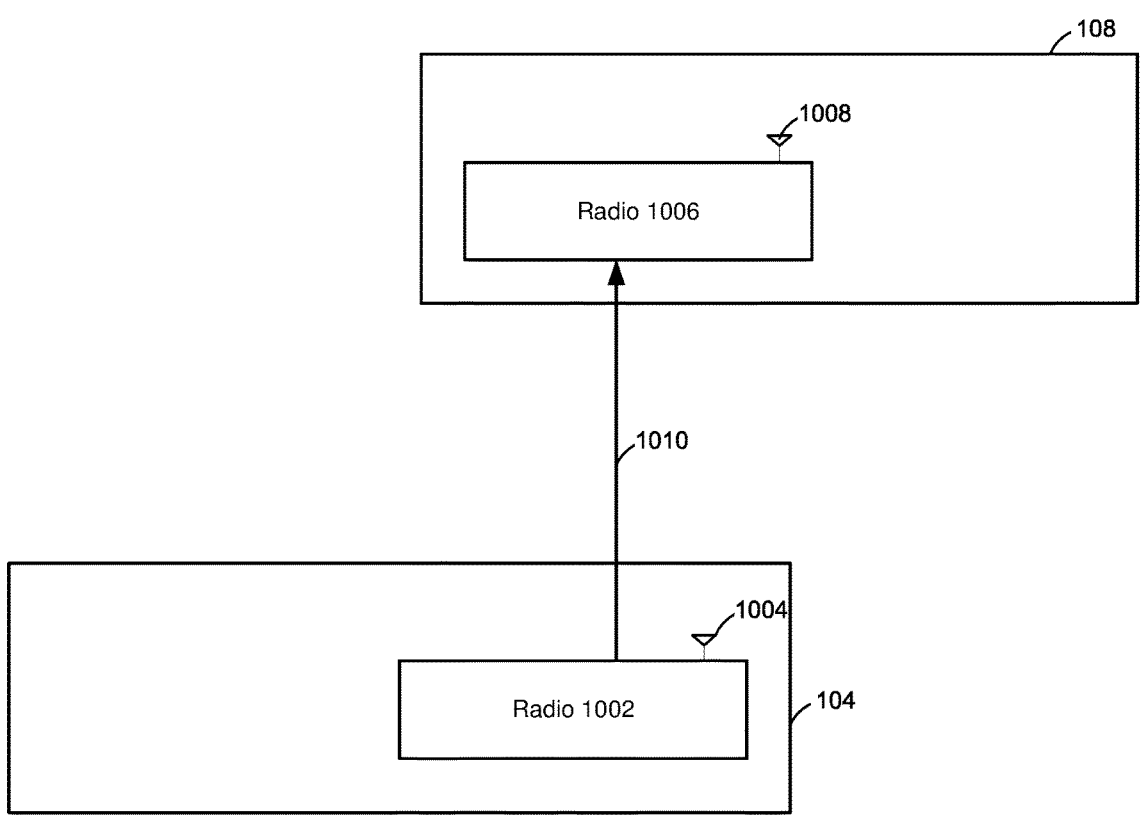
FIG. 10 illustrates an example of wireless charging using wireless power transmissions in accordance with one embodiment of the present disclosure.

FIG. 10 illustrates an example of wireless charging 1000 using wireless power transmissions of one embodiment of the present disclosure.

Referring to FIG. 10, more detailed views of the wireless power transmitter 104 and the wireless power receiver 104 of FIG. 1 are shown. The wireless power transmitter 104 may include a radio 1002 and one or more antenna 1004. The wireless power receiver 104 may include a radio 1006 and one or more antenna 1008. The radio 1002 may generate wireless transmissions 1010 (e.g., Wi-Fi, Bluetooth, cellular, etc. using radiofrequency waves) based on a current supply (e.g., from the power source 110 of FIG. 1), and the one or more antenna 1004 may transmit (e.g., directionally toward the one or more antenna 1008 based on beamforming training) the wireless transmissions 1010 as signals. The one or more antenna 1008 may receive the wireless transmissions 1010, whose energy may be converted by the wireless power receiver 104 to provide current to charge the battery 106 or the heating element 109 of FIG. 1.

Embodiments according to the disclosure are in particular disclosed in the attached claims directed to a system, device, method, a storage medium, and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computerexecutable program instructions. Likewise, some blocks of the block diagrams and flow diagrams may not necessarily need to be performed in the order presented, or may not necessarily need to be performed at all, according to some implementations.

Blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

For the purposes of the present document, the following terms and definitions are applicable to the examples and embodiments discussed herein.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or link, and/or the like.

That which is claimed is:

1. A system for wirelessly charging a point-of-use water heating device configured to be positioned at a hot-water point-of-use, the system comprising:

the point-of-use water heating device, wherein the point-of-use water heating device comprises a water heating element;

a battery configured to be positioned at the hot-water point-of-use, wherein the battery is connected to the heating element by a wired connection;

a wireless power transmitter configured to:

receive a first electrical current from a 110 Volt power receptacle; and generate a magnetic field, an ultrasonic wave, a microwave, a wireless power transmission, or a laser pulse based on the first electrical current; and a wireless power receiver configured to:

generate a second electrical current based on the magnetic field, the ultrasonic wave, the microwave, the wireless power transmission, or the laser pulse, wherein in a first mode based on a demand of the point-of-use water heating device being below a threshold demand, the water heating element and the battery are configured to receive the second electrical current from the wireless power receiver, and wherein in a second mode based on the demand of the point-of-use water heating device being above the threshold demand, the water heating element is configured to receive both the second electrical current from the wireless power receiver and a third electrical current from the battery.

2. The system of claim 1, wherein the wireless power transmitter is configured to be remote from the point-of-use water heating device.

3. The system of claim 1, wherein the wireless power transmitter generates (i) the magnetic field based on the first electrical current and wherein the second electrical current is generated based on inductance or the wireless power transmitter generates (ii) the magnetic field based on the first electrical current and wherein the second electrical current is generated based on resonance.

4. The system of claim 1, wherein the wireless power transmitter and the wireless power receiver are configured to be axially aligned and separated by a surface in between the wireless power transmitter and the wireless power receiver, and wherein the point-of-use water heating device is separated from the wireless power transmitter and the 110 Volt power receptacle by the surface.

5. The system of claim 1, wherein the wireless power receiver comprises a voltage regulator configured to charge the battery at a rate equal to a self-discharge rate of the battery.

6. The system of claim 1, wherein the wireless power transmitter comprises a first inductive surface configured to generate the magnetic field, wherein the wireless power transmitter comprises a first adhesive surface, wherein the wireless power receiver comprises a second inductive surface configured to generate the second electrical current, and wherein the wireless power receiver comprises a second adhesive surface.

7. The system of claim 1, wherein the second electrical current is provided to the water heating element based on inductance.

8. The system of claim 1, wherein the wireless power transmitter generates (i) the magnetic field based on the first electrical current and the wireless power receiver generates the second electrical current based on the magnetic field, (ii) the ultrasonic wave based on the first electrical current and the wireless power receiver generates the second electrical current based on the ultrasonic wave, (iii) the microwave based on the first electrical current and the wireless power receiver generates the second electrical current based on the microwave, (iv) the wireless power transmission based on the first electrical current and the wireless power receiver generates the second electrical current based on the wireless power transmission, the wireless power transmission using a radiofrequency transmission, or (v) the laser pulse based on the first electrical current and the wireless power receiver generates the second electrical current based on the laser pulse.

9. A point-of-use water heating device configured to be positioned at a hot-water point-of-use, the point-of-use water heating device comprising:

a heating element;

a battery connected to the heating element by a wired connection; and a wireless power receiver configured to:

generate, based on a magnetic field, an ultrasonic wave, a microwave, a wireless power transmission, or a laser pulse associated with a wireless power transmitter electrically connected to a 110 Volt power receptacle, first electrical current, wherein in a first mode based on a demand of the point-of-use water heating device being below a threshold demand, the heating element and the battery are configured to receive the first electrical current from the wireless power receiver, and wherein in a second mode based on the demand of the point-of-use water heating device being above the threshold demand, the heating element is configured to receive both the first electrical current from the wireless power receiver and a second electrical current from the battery.

10. The point-of-use water heating device of claim 9, wherein the wireless power transmitter is remote from the point-of-use water heating device.

11. The point-of-use water heating device of claim 9, wherein the wireless power receiver is configured to generate the first electrical current based on inductance or resonance.

12. The point-of-use water heating device of claim 9, wherein the wireless power receiver is configured to be separated by a surface in between the wireless power transmitter and the wireless power receiver, and wherein the point-of-use water heating device is separated from the wireless power transmitter and the 110 Volt power receptacle by the surface.

13. The point-of-use water heating device of claim 9, further comprising a voltage regulator configured to charge the battery at a rate equal to a self-discharge rate of the battery.

14. The point-of-use water heating device of claim 9, wherein the wireless power receiver comprises an inductive surface associated with generating the first electrical current, and wherein the wireless power receiver comprises an adhesive surface.

15. The point-of-use water heating device of claim 9, wherein the wireless power receiver is configured to generate the first electrical current based on (i) the magnetic field, (ii) the ultrasonic wave, (iii) the microwave, (iv) the wireless power transmission, the wireless power transmission using a radiofrequency transmission, or (v) the laser pulse.

16. A method for wirelessly charging a point-of-use water heating device positioned at a hot-water point-of-use, the method comprising:

receiving, by a wireless power transmitter, a first electrical current from a 110 Volt power receptacle;

generating, using the wireless power transmitter, a magnetic field, an ultrasonic wave, a microwave, a wireless power transmission, or a laser pulse based on the first electrical current;

detecting, by a wireless power receiver, the magnetic field, the ultrasonic wave, the microwave, the wireless power transmission, or the laser pulse;

generating, using the wireless power receiver, a second electrical current based on the magnetic field, the ultrasonic wave, the microwave, the wireless power transmission, or the laser pulse;

receiving, by water heating element of the point-of-use water heating device and a battery positioned at the hot-water point-of-use, in a first mode based on a demand of the point-of-use water heating device being below a threshold demand, the first electrical current from the wireless power receiver; and receiving, by the water heating element, in a second mode based on the demand of the point-of-use water heating device being above the threshold demand, both the first electrical current from the wireless power receiver and a second electrical current from the battery.

17. The method of claim 16, wherein the wireless power transmitter is configured to be remote from the point-of-use water heating device.

18. The method of claim 16, wherein the wireless power transmitter and the wireless power receiver are configured to be axially aligned and separated by a surface in between the wireless power transmitter and the wireless power receiver, and wherein the point-of-use water heating device is separated from the wireless power transmitter and the 110 Volt power receptacle by the surface.

19. The method of claim 16, further comprising charging, with a voltage regulator of the wireless power receiver, the battery at a rate equal to a self-discharge rate of the battery.

20. The method of claim 16, wherein the wireless power transmitter comprises a first inductive surface configured to generate the magnetic field, wherein the wireless power transmitter comprises a first adhesive surface, wherein the wireless power receiver comprises a second inductive surface configured to generate the second electrical current, and wherein the wireless power receiver comprises a second adhesive surface.

* * * * *